United States Patent [19]
Hudkins et al.

[11] Patent Number: 6,099,771
[45] Date of Patent: Aug. 8, 2000

[54] VACUUM COMPRESSION METHOD FOR FORMING MOLDED THERMOPLASTIC FLOOR MAT HAVING A "CLASS A" FINISH

[75] Inventors: Patrick E. Hudkins, Carlisle; Vinod Parekh, Mechanicsburg, both of Pa.

[73] Assignee: Lear Corporation, Southfield, Mich.

[21] Appl. No.: 09/112,044

[22] Filed: Jul. 8, 1998

[51] Int. Cl.[7] .......................... B29C 35/16; B29C 43/04; B29C 43/14; B29C 43/50; B29C 43/56
[52] U.S. Cl. .......................... 264/102; 264/294; 264/322; 264/325; 425/384; 425/437; 425/411; 425/405.1
[58] Field of Search .................................. 264/102, 553, 264/237, 294, 319, 322, 348, 510, 571, 325; 425/384, 394, 437, 411, 405.1

[56] References Cited

U.S. PATENT DOCUMENTS

| | | |
|---|---|---|
| 3,023,459 | 3/1962 | Cook . |
| 3,444,275 | 5/1969 | Willett ........................................ 264/26 |
| 3,485,908 | 12/1969 | Burger ..................................... 264/102 |
| 3,608,143 | 9/1971 | Schutz ..................................... 264/510 |
| 3,953,632 | 4/1976 | Robinson .................................. 428/95 |
| 4,267,142 | 5/1981 | Lankheet ................................. 264/510 |
| 5,023,041 | 6/1991 | Jones et al. .............................. 264/510 |
| 5,242,652 | 9/1993 | Savigny ................................... 264/510 |
| 5,554,333 | 9/1996 | Fujiki ...................................... 264/284 |
| 5,770,243 | 6/1998 | Butterworth ............................. 425/389 |
| 5,891,546 | 4/1999 | Sherman ................................... 428/88 |

*Primary Examiner*—Jan H. Silbaugh
*Assistant Examiner*—Michael Poe
*Attorney, Agent, or Firm*—Wood, Herron & Evans, L.L.P.

[57] ABSTRACT

Method for making flexible, noncarpeted thermoplastic articles, including floor mats. The method includes placing a flat slab of thermoplastic material in a cavity between first and second mold sections with each mold section having a mold surface for contacting a respective surface of the slab. The mold cavity is placed under vacuum and the mold sections are heated under compression to cause the thermoplastic material to heat and flow against the mold surfaces. The process further involves cooling the mold sections under compression and removing the floor mat from the mold sections. Vacuum is maintained in the mold cavity by way of a check valve device during transition from the heated compression apparatus to the cooled compression apparatus and during the cooled compression step. In this general manner, a floor mat formed with a Class A, textured finish and with a variable cross sectional thickness may be manufactured in a short cycle time.

12 Claims, 4 Drawing Sheets

VACUUM COMPRESSION METHOD FOR FORMING MOLDED THERMOPLASTIC FLOOR MAT HAVING A "CLASS A" FINISH

FIELD OF THE INVENTION

The present invention relates generally to thermoplastic articles and, more specifically, to noncarpeted floor mats such as those typically used in passenger or luggage compartments of automobiles or in homes and workplaces.

BACKGROUND OF THE INVENTION

Manufacturers of so-called noncarpeted auxiliary floor mats, such as those used in automobiles, generally have been limited to using thermoset compounds, such as those determined to be in the broad category of rubbers. Thermoset compounds are not considered to be 100% recyclable since the material undergoes a chemical change during the curing process. Due to this chemical change, the material cannot be simply remelted and formed back into a similar product. Mats manufactured from thermoset materials are typically produced in a compression molding process requiring relatively low compression pressures, such as on the order of 50–250 psi, but relatively long process cycle times that allow for the chemical reaction to take place during the curing process. These cycle times can be on the order of 180–300 seconds.

In conventional thermoset rubber compression molding processes, the rubber is generally prepared in the form of a slab or so-called pre-prep prior to its placement within a mold. The mold is basically comprised of two sections defining a mold cavity, but has also included more sophisticated multiple sections to form the mold cavity. To provide a surface finish suitable for the automotive industry Class A rating, for example, the manufacturer needs to accurately control the molding process to assure that the rubber material provides a flow front which pushes the air within the mold cavity away from the surfaces of the molding tool. Additionally, the manufacturer may incorporate a slow close process or bump steps in the molding cycle to remove air and other volatiles in the rubber compound from the surface of the tool. These processes assure fuller contact of the rubber compound with the mold surface but also increase the necessary process cycle time. In these processes, direct, continuous contact of the rubber with the surface of the mold is necessary to create an outer surface in the final product which is free of blemishes caused by air bubbles and/or voids. Full contact of the rubber with the mold surface also allows the product to pick up the grain or surface finish texture of the interior mold surface.

In addition to compression molding, injection molding of thermoset materials has been used to produce noncarpeted auxiliary floor mats which exhibit surface finishes considered to be Class A. However, disadvantages as found in compression molding are also experienced with injection molding techniques. These include long manufacturing cycle times and floor mats that are heavier than desired and not fully or easily recyclable. Injection molding processes may also be used to produce thermoplastic products which are easier to recycle. However, these processes require high molding pressures ranging from 2000 to 6000 psi. Injection molding processes generally have a number of material limitations and process limitations that make producing a floor mat with varying cross sectional thickness difficult.

Floor mats having a varying cross sectional thickness are considered to be difficult to injection mold as the process itself introduces many stresses into the material. This is due to the variable time required to cool the different cross sectional thicknesses. These stresses introduced by the injection molding process cause warpage which not only detracts from the appearance of the finished product but often fails to meet the physical tolerance specifications of these products.

Another process in the prior art for producing noncarpeted floor mats from thermoplastic materials is known as an extrusion/embossing process using matched metal rolls. In this process, it is possible to produce floor mats with some variable cross sectional thicknesses, however, the detail and design of the surface geometry and the finish is more limited than in similar products, such as those produced by injection molding. This process also is susceptible to warpage in the finished product due to the inability to evenly cool the variable cross sectional thicknesses. Thus, floor mats produced according to such processes cannot meet the stringent design and geometrical tolerancing often required, for example, by the automotive industry.

To address problems such as those problems mentioned above, it would be desirable to provide methods and apparatus for forming a noncarpeted thermoplastic floor mat in an efficient, cost effective, yet high quality manner.

SUMMARY OF THE INVENTION

The present invention provides a method of making a flexible, noncarpeted thermoplastic floor mat that includes placing a flat slab or pre-prep of thermoplastic material in a cavity between first and second mold sections, which may also be referred to as tool or die sections. Each mold section includes a mold surface for contacting a respective surface of the slab. The cavity is then placed under vacuum and the mold sections are heated to a temperature at which the slab will soften and flow under pressure. Finally, the slab or pre-prep of thermoplastic material is compressed between the mold sections thereby causing material to heat and flow against the mold surfaces to form the floor mat. In accordance with the invention, the mold sections are further cooled under compression, preferably between a separate set of chilled platens, and the floor mat is subsequently removed from the mold cavity.

It should be noted that the process of this invention utilizes low pressures of 50–400 psi and allows short total process cycle times of between about 60 seconds and 90 seconds. High quality floor mats are therefore produced quickly and inexpensively by this process. Warpage of the mats is prevented by minimizing the stresses induced on the thermoplastic material or slab during forming and cooling the floor mat. The air within the mold cavity is removed through the application of a vacuum within the mold prior to the application of compressive forces used to heat, form and cool the floor mats. The vacuum is preferably maintained during the heated and cooled compression steps. This results in a Class A surface finish which is free of imperfections caused by trapped air and volatiles within the mold cavity and without having to apply extremely high molding pressures as conventionally required for Class A finishes on floor mats.

As briefly mentioned above, the vacuum is preferably maintained within the cavity between the mold sections until completion of the cooling step. Preferably, a check valve is used and constructed in a manner which allows a vacuum to be drawn therethrough prior to and preferably during the heated compression step and further allows transfer of the mold sections while maintaining the vacuum until after the cooled compression step. The vacuum is released after the cooled compression step and, more preferably, positive pressurized air may be introduced through the check valve to additionally assist with separation of the mold sections and freeing the finished floor mat from the mold.

The mold is preferably a hinged book mold and is received during the heated compression step between platens that are each heated at a temperature between about 300° F. and about 425° F. Preferably, the surface temperature of the mold cavity will be from 40–75° C., or about 104° F. to about 167° F. Prior to molding, the slab of thermoplastic material may have a substantially uniform thickness, while the molded, finished floor mat may be formed with a cross section of variable thickness. The mold surfaces may respectively form upper and lower surfaces of the floor mat with the lower surface of the floor mat being formed with a plurality of nibs and the upper surface of the floor mat being formed with a Class A finish, which may be a contoured and textured finish.

Apparatus for making a flexible, noncarpeted thermoplastic floor mat in accordance with the process as generally described above is also contemplated within the scope of this invention. Such apparatus preferably takes the form of first and second mold sections as generally described above, along with sealing structure disposed between the first and second mold sections and about the mold cavities for forming a substantially airtight seal around the mold cavities, and a vacuum channel communicating with the mold cavity. The seal is designed in such a manner as to make contact with the opposite section of the mold and provide enough resistance to hold the upper section of the mold away from the thermoplastic slab. This defines a sealed chamber around the mold cavity and the associated thermoplastic slab. The apparatus may include first and second presses, with the first press being a heated platen press and the second press being a cooled platen press.

It will be appreciated that the present invention allows the production of 100% recyclable floor mats from thermoplastic materials in a vacuum compression molded process while conforming to stringent surface finish requirements and incorporating a grained or textured surface finish, for example, using low compression pressures and much shorter cycle times than were possible with past methods.

These and other advantages of the invention will become more readily apparent to those of ordinary skill in the art upon review of the following detailed description taken in conjunction with the accompanying drawings.

DETAILED DESCRIPTION OF THE PREFERRED EMBODIMENTS

Figure 1:
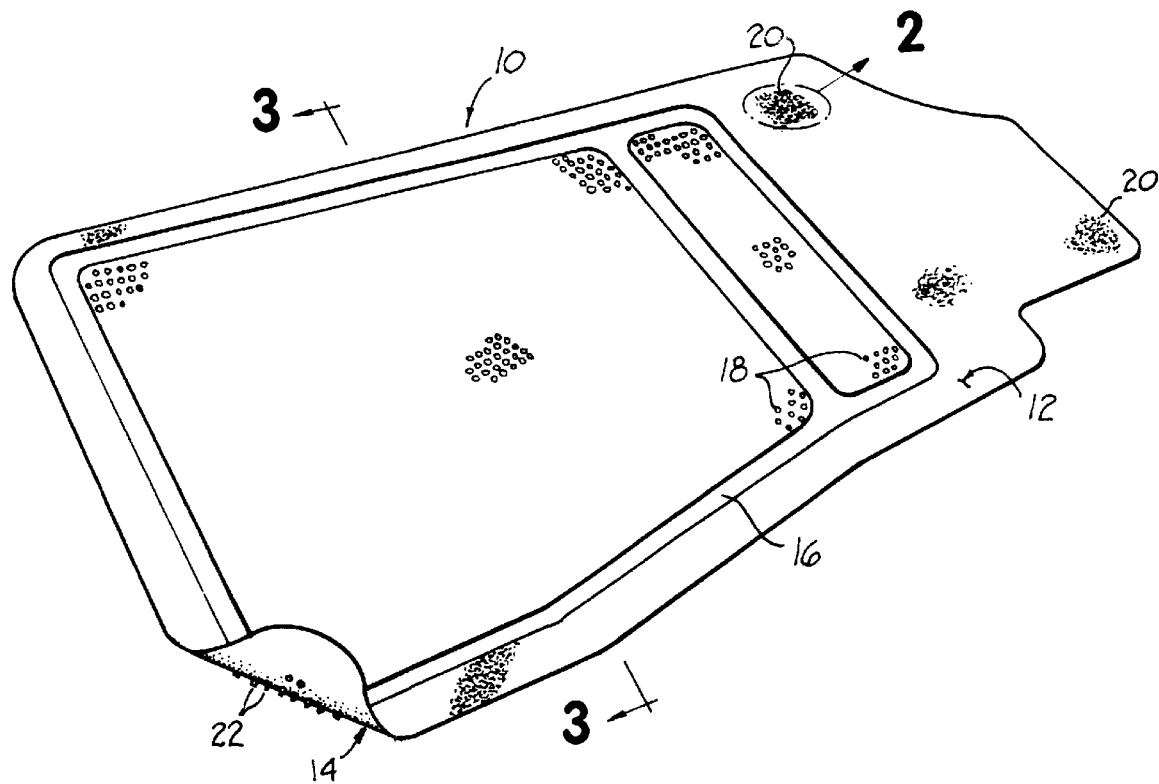
FIG. 1 is a perspective view of an auxiliary, thermoplastic floor mat constructed in accordance with the invention.
Figure 2:
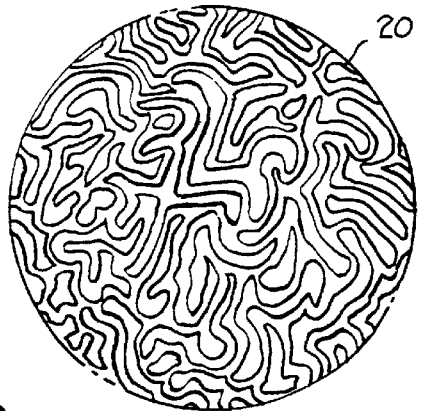
FIG. 2 is an enlarged view of a textured surface finish of the floor mat shown in FIG. 1.
Figure 3:
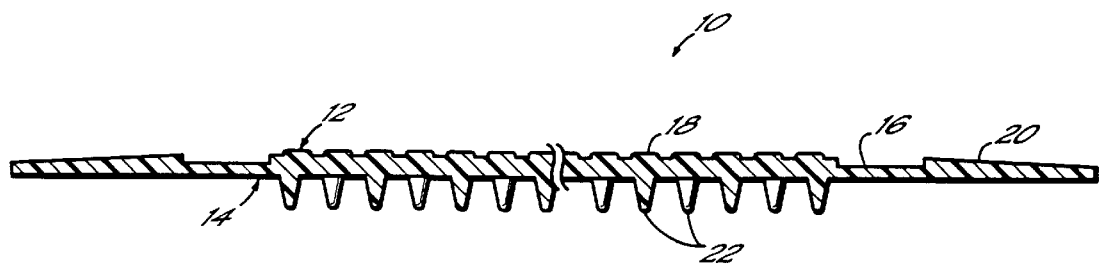
FIG. 3 is a cross sectional view of the floor mat shown in FIG. 1 taken along line 3—3 thereof.

Referring first to FIGS. 1–3, an auxiliary, noncarpeted floor mat 10 is shown as constructed in accordance with one preferred embodiment of the invention. Also, in accordance with the various inventive principles, other articles having similar benefits and features may be formed as well. However, for convenience, only a floor mat is specifically described herein. Floor mat 10 includes an upper surface 12 and a lower surface 14 defining a variable thickness therebetween. Floor mat 10 may be constructed from various thermoplastic materials and is preferably constructed entirely of thermoplastic material. The preferred thermoplastic material is a flexible thermoplastic olefin sold under the trade name MASLITE F by the Masland Division of Lear Corporation of Carlisle, Pa. However, other materials such as polyethylene, thermoplastic elastomers and flexible vinyls can also be utilized in the invention. Floor mat 10 may be constructed with various shapes depending on the intended applications. Floor mat 10, as shown in FIGS. 1–3 is constructed for use within an automobile passenger compartment. Upper surface 12 is typically constructed with various designs, including recesses or wells 16 complimented by raised areas 18 and, for example, a wide variety of textured surface areas, such as surface 20 particularly represented in FIG. 2. Lower surface 14 typically includes projecting nibs 22 as are conventional for retaining floor mat 10 in place on a carpeted area of an automobile. In accordance with the invention, the entire upper and lower surface area of floor mat 10 may be manufactured with a Class A surface finish. Such a surface finish is generally defined as being free of waves, dings, or other surface imperfections. These surfaces must match a master texture or textures, master color(s) and master gloss samples and must hold close tolerances of, for example, ±0.5 mm.

Figure 4:
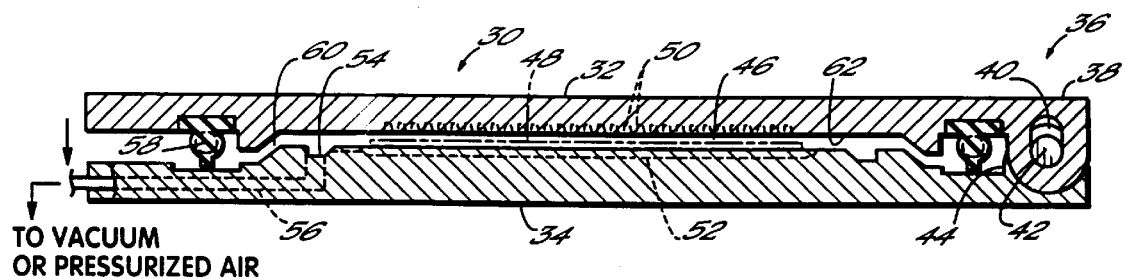
FIG. 4 is an elevated cross sectional view of a book mold constructed in accordance with a preferred embodiment of this invention.

FIG. 4 illustrates a preferred construction of a compression book mold 30 used for forming floor mat 10. Specifically, mold 30 includes an upper section 32 and a lower section 34 connected along one side by a hinge 36. It will be appreciated that mold 30 may take on many different configurations, including more complex, multi-section configurations. In the configuration shown, an upper hinge portion 38 includes a slotted region 40 for receiving a hinge pin 42. Hinge pin 42 is further received in a lower hinge portion 44. As will be appreciated from the description to follow, this slotted hinge construction allows upper mold section 32 to move toward lower section 34, for example, in a linear fashion during a compression molding process. Mold 30 further includes a mold cavity 46 generally defined between mold sections 32 and 34. Cavity 46 receives a slab of thermoplastic material 48 which is preferably slightly thicker than the thickest section of the finished floor mat 10. In this embodiment, upper mold section 32 is shown to include recesses 50 that will form lower nibs 22 of floor mat 10 (FIG. 3). Lower mold section 34 is shown to have a contoured, recessed surface corresponding to the contoured upper surface 12 of floor mat 10. A channel 54 is formed to surround mold cavity 46 and communicates with a passage 56 which is adapted to be connected to either a vacuum source or pressurized air depending on the process step being performed, as will be discussed below. An inflatable seal 58 also completely surrounds at least cavity 46 and, preferably, a larger space 60 which includes cavity 46.

Based on a review of FIG. 4, it will be appreciated that passage 56 not only communicates with channel 54, but also communicates with space 60, as well as contoured, recessed surface 52 and recesses 50. With regard to recesses 50, seal 58 should hold a lower interior surface 62 of upper mold section 32 away from an upper surface of slab 48 in the rest position, as shown in FIG. 4. This allows a vacuum to be drawn through passage 56 without any air being trapped within recesses 50 by the upper surface of slab 48.

Figure 5:
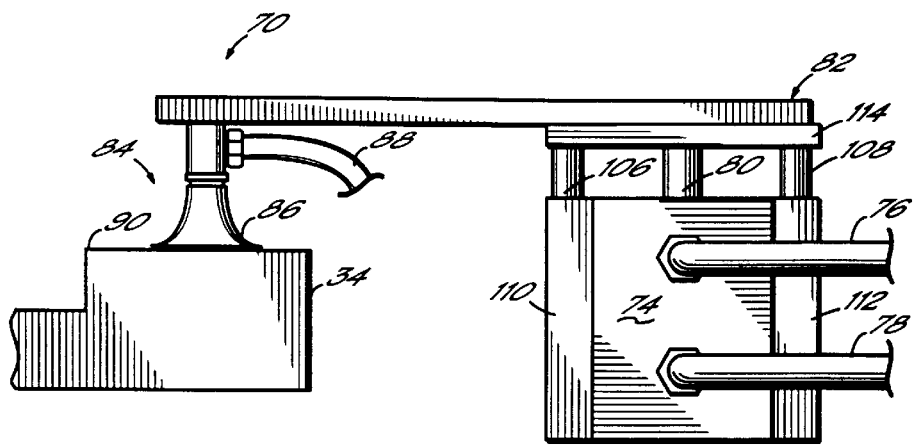
FIG. 5 is a an elevational view of an air cylinder and guide rod arrangement used for actuating the check valve of this invention.
Figure 6:
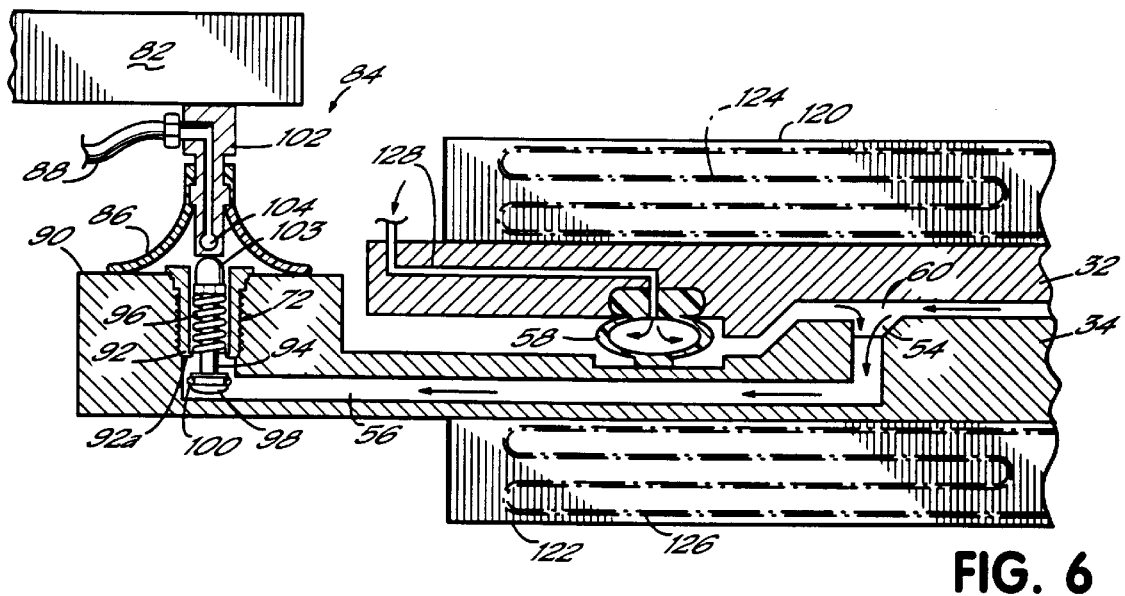
FIG. 6 is an enlarged cross sectional view of a portion of the compression molding apparatus shown during the heated compression step.

FIG. 5 illustrates a check valve actuating device 70 constructed in a preferred manner and, as shown in FIG. 6, operative to actuate a check valve 72 communicating with channel 56 in lower mold section 34. From the description to follow, it will be appreciated that check valve actuating device 70 may be used to open check valve 72 to draw air out of passage 56 and, therefore, place space 60 under vacuum. Device 70 may further be used to close check valve 72 to maintain vacuum within space 60 and, as also discussed below, the same type of actuating device as device 70 may be used to open check valve 72 and introduce pressurized air into space 60, as will be discussed with respect to FIG. 8.

More specifically, as shown in FIG. 5, check valve actuating device 70, or similar devices used during the heated compression and cooled compression steps of this invention may comprise a double acting air cylinder 74 of conventional construction including compressed air input/outlet lines 76, 78 and a rod 80 that reciprocates in one direction or the other depending on whether pressurized air is introduced through line 76 or line 78. Piston rod 80 is secured to a plate structure 82 or other structure connecting rod 80 to a sealing and actuating device 84, including a flexible cup 86, similar to a suction cup. An air line 88 communicates with the interior of cup 86 for reasons to be discussed below. As also shown in FIGS. 5 and 6, suction cup 86 seals with an upper surface 90 of lower mold section 34.

More specifically referring to FIG. 6, check valve 72 includes a valve body 92 threaded into lower mold section 34 and a reciprocating valve stem 94 mounted within valve body 92 and held in a normally closed position by a coil spring 96. One end of the valve stem 94 is formed as a valve member 98 with a seal 100 that seats against a lower edge 92a of valve body 92. This prevents any air movement through valve 72. An actuating member 102 forming part of sealing and actuating device 84 engages an upper end portion 103 of valve stem 94 to open valve 72 as shown in FIG. 6. An opening 104 in actuating member 102 communicates with air line 88 (FIG. 5) for allowing a vacuum source to draw air out of space 60, through passage 56 and valve 72 as also shown in FIG. 6.

It will be appreciated from a review of FIG. 6 that a high degree of accuracy is desirable in locating suction cup 86 and actuating member 102 with respect to check valve 72 and, specifically, upper end portion 103 of valve stem 94. Therefore, as shown in FIG. 5, it is preferred to use a pair of guide rods 106, 108 mounted in a sliding manner within respective guide bushings 110, 112 and connected, for example, to a support plate 114 that also connects to piston 80 and forms part of connecting plate structure 82. Guide rods 106, 108 help ensure a high degree of accuracy and repeatability in locating the placement of sealing and actuating device 84 with respect to check valve 72.

The first step in the vacuum compression molding process of this invention may best be understood upon review of FIG. 4 and FIG. 6. In this regard, a slab of thermoplastic material 48 is placed within mold cavity 46 as shown in FIG. 4 and generally described above. Mold 30 is then placed within a press having upper and lower platens 120, 122. The remaining press structure is not shown in the drawings, as it may be a conventional press capable of exerting pressures between about 50 psi and about 400 psi or greater to carry out the invention. The press is ideally a so-called multiple daylight press having several pairs of platens for receiving a plurality of molds 30 during each cycle. Platens 120, 122 are each heated, for example, by conventional electric heating coils 124, 126 or other electric, resistance-type heaters. Other types of conventional heating systems may also be used for platens 120, 122. When mold 30 is in the position shown in FIG. 4, sealing and actuating device 84 is moved downward by air cylinder 74 (FIG. 5) and vacuum is drawn through air line 88. This evacuates space 60, including mold cavity 46 to a pressure of at least about 15 inches of mercury. Also, air is introduced into inflatable seal 58 at about 15 psi. Platens 120, 122 may be heated, for example, to between about 300° F. and about 425° F., depending on the thermoplastic material being molded, and the construction of mold 30. The object is to heat slab 48 enough that it will soften and flow under compression within the various contours and recesses of mold cavity 46. The vacuum through check valve 72 is maintained preferably during the entire heated compression step. At the completion of this step, for example, after about 60 seconds in most cases, air cylinder 74 is actuated again to lift actuating member 102 to close check valve 72 by way of the automatic return action of spring 96 acting to move valve member 98 and seal 100 against lower edge 92a of valve body 92.

Figure 7:
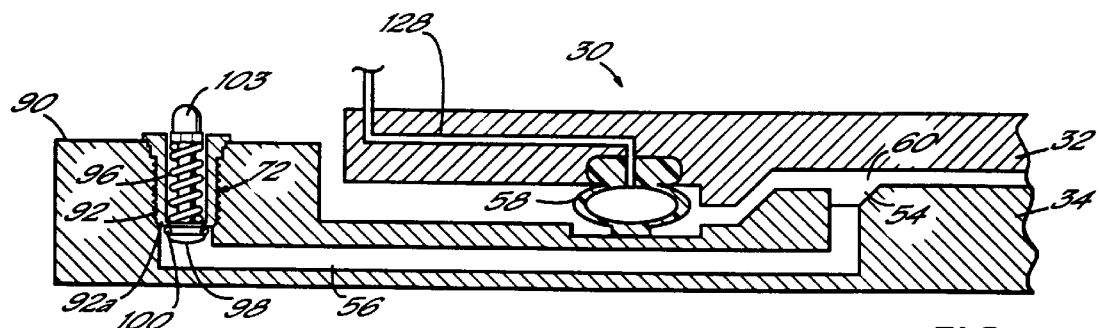
FIG. 7 is a view similar to FIG. 6, but showing the mold in transition between the heated compression and cooled compression steps.
Figure 8:
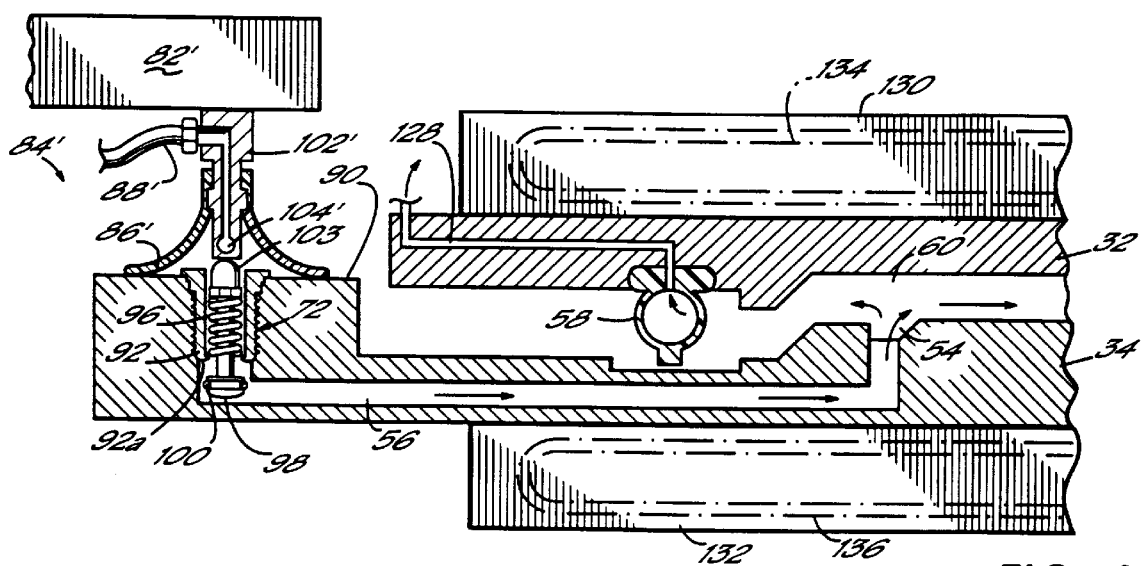
FIG. 8 is a view similar to FIGS. 6 and 7, but showing the apparatus during the cooled compression step.

As shown in FIG. 7, upper and mold sections 32, 34 will be held together by the vacuum condition maintained in passage 56 and space 60 by the closed check valve 72. In this state, mold 30 is transferred into another press or press section having upper and lower cooled or chilled platens 130, 132 as shown in FIG. 8. This transference may be performed using conventional conveyors (not shown), such as roller conveyors to make the transfer as quick as possible.

FIG. 8 specifically shows the process step immediately after a chilled or cooled compression step has taken place. In this regard, it will be understood that with the vacuum condition maintained as shown in FIG. 7, upper and lower chilled platens 130, 132 (FIG. 8) each, for example, having respective passageways 134, 136 for circulating cooling fluid, such as chilled water, are moved together to compress the formed floor mat under a chilled condition. This step, for example, may be performed for between about 10 and 30 seconds until the mat completely solidifies. Immediately after the chilled compression step, a sealing and actuating device 84' is lowered as shown in FIG. 8 to open check valve 72. It will be appreciated that device 84' may be constructed the same as device 84 in FIG. 6 and like reference numerals with prime marks (') in FIG. 8 refer to like structure in FIG. 6. The difference is that air line 88' delivers positive pressurized air into passage 56, channel 54 and space 60, instead of vacuum as in FIG. 6. This pressurized air is preferably delivered at about between 60 and 80 psi and helps to separate mold sections 32, 34 from the finished mat 10 (FIG. 1).

EXAMPLE

As an illustrative example of the invention, the vacuum compression molding process as described above was carried out to form a noncarpeted floor mat as shown in FIG. 1, and the following parameters were implemented:
Slab Material: MASLITE F
Slab Thickness: 0.194"–0.210"
Hot Press Platen Temperature: 390° F. +/–30° F.
Interior Surface Temperature of Mold During Heated Compression Step: 310° F. to 390° F.
Hot Press Vacuum Pressure: 15 to 28 inches mercury
Time to Reach Vacuum Pressure: 5 seconds
Hot Compression Press Pressure: 150 PSI applied to the mold surfaces
Hot Compression Time: 30 seconds/closed
Time to Transfer to Cooled Press: 5 seconds
Cooled Press Platen Temperature: 50° F.
Cooled Compression Press Pressure: 150 PSI applied to the mold
Cooled Compression Press Time: 30 seconds/closed Total Cycle Time: 70 to 75 seconds The resulting product was a variable thickness, noncarpeted floor mat exhibiting a Class A surface finish. The floor mat also had the necessary uniformity of color, as controlled by the color of the thermoplastic slab, and desirable flexibility and wear characteristics.

Figure 9:
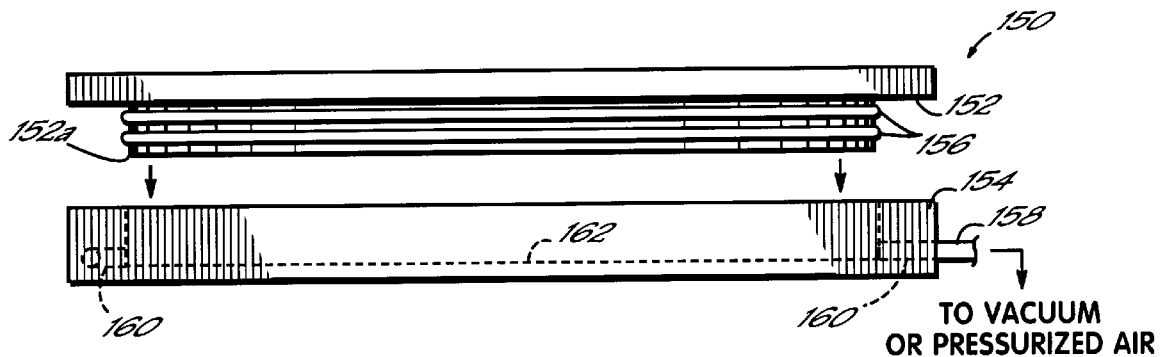
FIG. 9 is a schematic, elevational view of one alterative mold apparatus.

FIG. 9 illustrates one alternative mold apparatus 150 for molding floor mats as described above. Upper and lower sections 152, 154 are provided with upper section 152 having a wall 152a defining an interior space (not shown) with exterior seals 156 for engaging lower section 154. A conduit 158 communicates with a passage 160, or a series thereof, which in turn communicate with an interior space 162. Interior space 162 and the space (not shown) defined by wall 152a may have appropriate contoured mold surfaces directly formed therein, or may alternatively receive an appropriate multi-section mold for forming a floor mat such as floor mat 10.

Figure 10:
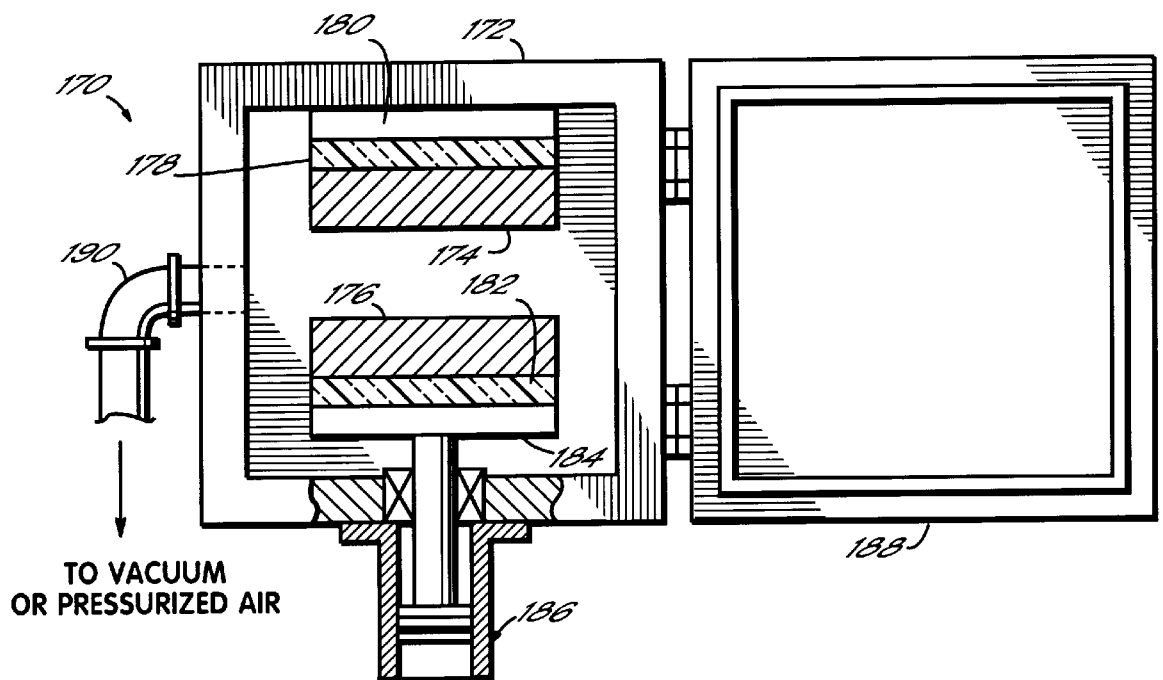
FIG. 10 is a schematic, elevational view of a second alternative mold apparatus.

FIG. 10 illustrates a second alternative mold apparatus 170 which is essentially an enclosable or sealable chamber 172 for containing respective upper and lower platens 174, 176. Platen 174 may be a stationary platen connected to an insulating layer 178 and a support 180. Platen 176 likewise may be connected to an insulating layer 182 and also connected to a movable ram 184 schematically illustrated as connected to a conventional hydraulic piston assembly 186. A door 188 may be closed and sealed during press operation and a conduit 190 may be used to evacuate the interior of enclosure 172. As with the other embodiments, this conduit 190 may also be connected to pressurized air for introduction after the cooled compression step. Mold apparatus 170 may be used in conjunction with a separate mold, similar to mold 30, or molds may be incorporated directly on platens 174, 176.

This has been a description of the present invention, along with the preferred methods of practicing the present invention as currently known. While the present invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. For example, the various individual aspects and features of the invention may be combined or used in different ways to achieve similar results and advantages. The invention in its broader aspects is therefore not limited to the specific details, representative apparatus and methods as shown and described but is defined by the appended claims.

What is claimed is:

1. A method of making a flexible, noncarpeted thermoplastic floor mat having a surface with a Class A finish, the method comprising:
   placing a slab of flexible thermoplastic material in a cavity between first and second mold sections, the slab having a peripheral edge and each mold section having a mold surface for contacting a respective surface of the slab,
   forming an airtight seal around the cavity and outside of the peripheral edge of the slab,
   placing the cavity under vacuum,
   heating the mold sections to a temperature at which the slab will soften and flow under pressure,
   compressing the slab of thermoplastic material between the mold sections thereby causing the material to heat and flow against the mold surfaces to form the floor mat,
   cooling the mold sections to a temperature at which the floor mat will solidify,
   compressing the floor mat between the mold sections during the cooling step, and
   maintaining the vacuum during the heating and cooling steps and each compressing step.

2. The method of claim 1, wherein the vacuum is maintained by a check valve.

3. The method of claim 1, wherein the vacuum is released after the cooling step and pressurized air is introduced into the cavity.

4. The method of claim 1, wherein the compressing step is performed for less than about 90 seconds.

5. The method of claim 1, wherein the compressing step is performed at a pressure of less than about 400 psi.

6. The method of claim 1, wherein the heating step is performed by a pair of heated, opposed platens disposed to receive the first and second mold sections and operatively connected to a press which moves at least one of the first and second mold sections toward the other of the first and second mold sections.

7. The method of claim 6, wherein the platens are each heated at a temperature between about 300° F. and about 425° F.

8. The method of claim 1, wherein the slab of thermoplastic material has a substantially uniform thickness and the floor mat is formed with a cross section of variable thickness.

9. The method of claim 8, wherein the mold surfaces respectively form upper and lower surfaces of the floor mat with the lower surface of the floor mat being formed with a plurality of nibs and the upper surface of the floor mat being formed with the Class A finish.

10. The method of claim 9, wherein the upper surface of the floor mat is formed with a Class A textured finish.

11. A method of making a flexible, noncarpeted floor mat having a surface with a Class A finish, the method comprising:
   placing a slab of flexible thermoplastic material in a cavity between first and second mold sections, the slab having a peripheral edge and each mold section having a mold surface for contacting a respective surface of the slab and one of said mold sections having a peripheral seal extending outside of and around the peripheral edge of the slab,
   moving at least one of the mold sections toward the other to establish an airtight seal around the mold cavity by contacting said other mold section with the peripheral seal, placing the mold cavity under vacuum by operatively connecting a vacuum source to a passage communicating with the mold cavity, heating the mold sections to a temperature at which the flexible thermoplastic material will soften and flow under pressure.

12. A method of making a flexible, noncarpeted floor mat having a surface with a Class A finish, the method comprising:

placing a slab of flexible thermoplastic material in a cavity between first and second mold sections, the slab having a peripheral edge and each mold section having a mold surface for contacting a respective surface of the slab and one of said mold sections having a peripheral seal extending outside of and around the peripheral edge of the slab, moving at least one of the mold sections toward the other to establish an airtight seal around the mold cavity with the peripheral seal, opening a check valve coupled for fluid communication with the mold cavity, placing the cavity under vacuum by coupling a vacuum source to a peripheral edge portion of the cavity through the open check valve, heating the mold sections to a temperature at which the flexible thermoplastic material will soften and flow under pressure, compressing the slab of flexible thermoplastic material between the mold sections thereby causing the material to heat and flow against the mold surfaces to form the floor mat, cooling the mold sections, maintaining the vacuum with the check valve during the heating, compressing and cooling steps, introducing pressurized air into said cavity through the check valve following the cooling step, and removing the floor mat from the mold sections.

* * * * *

UNITED STATES PATENT AND TRADEMARK OFFICE
CERTIFICATE OF CORRECTION

PATENT NO.   : 6,099,771
DATED         : August 8, 2000
INVENTOR(S)  : Patrick E. Hudkins et al.

Page 1 of 1

It is certified that error appears in the above-identified patent and that said Letters Patent is hereby corrected as shown below:

<u>Column 9,</u>
Line 6, after "under pressure" delete "." and insert -- , --
Line 6, after "under pressure" insert:

-- compressing the slab between the mold sections thereby causing the material to heat and flow against the mold surfaces to form the floor mat, Cooling the mold sections, Maintaining the vacuum in said mold cavity during the heating, compressing and cooling steps using a check valve coupled for fluid communication with the mold cavity and the vacuum source, Introducing pressurized air into said mold cavity through the check valve, and Removing the floor mat from mold sections. --

Signed and Sealed this

Twenty-eighth Day of August, 2001

*Attest:*

Nicholas P. Godici

NICHOLAS P. GODICI
*Attesting Officer*   *Acting Director of the United States Patent and Trademark Office*